Figure 1:
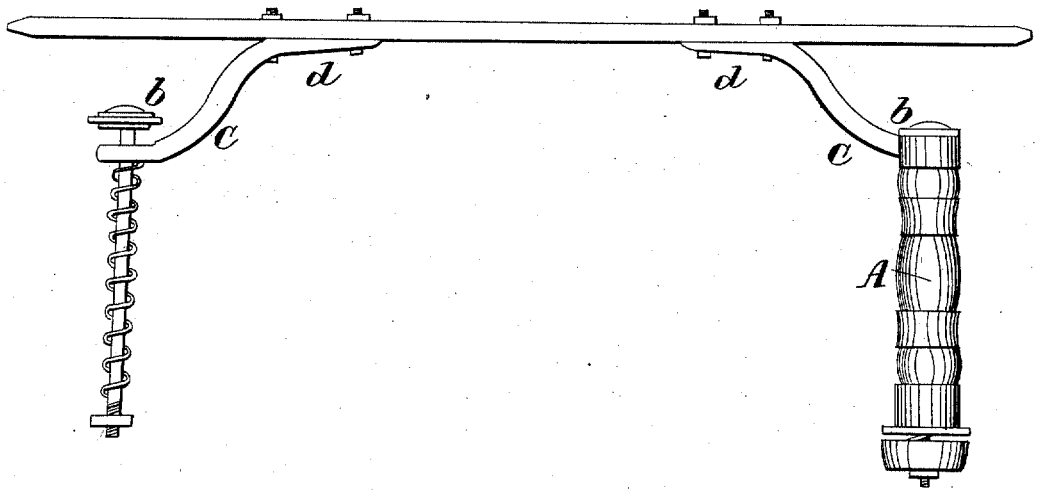

9315X

H. MELLISH.

Carriage-Spring.

Patented Jan. 11, 1836.

N. PETERS, PHOTO-LITHOGRAPHER, WASHINGTON, D. C.

Henry Mellish of Walpole, No. 16. 9315X
Letters Patent

The schedule referred to in these Letters Patent and making part of the same, containing a description, in the words of the said Henry Mellish himself, of his improvement in hanging wagons, and other carriages —

---

To all to whom these presents shall come; Be it known that I, Henry Mel-lish of Walpole, in the County of Cheshire, and State of New Hampshire, have invented a new and useful improvement being a method of hanging Carriages with tubes and Spiral springs and that the following is a full and exact descrip-tion thereof, reference being had to the annexed drawing. A. in fig. 1. is a view of the tube as applied to the purpose for which it is intended, the same being of cast iron or other metal, six inches long and two inches in diameter and one fourth of an inch thick the same enclosing a spiral spring which should be made of one quarter inch wire, and wound sufficiently long & large to fit the inside of the tube. The tube should be round except at the bottom where it is brought to a square by projections 1/4 of an inch thick running out from the tube so as to form corners. This tube should have an opening on one side at the upper end 5/8 of an inch wide and two inches long, and a cap piece of metal to cover the top as may be seen at b.b. The springs and tube should be applied to use by inserting the foot of the jack c. into the top of the tube and the arm of the same into the opening at the side — —

Place one of these tubes and springs at each end of the rocker, also one at each end of the bolster of the carriage. Then by passing a bolt down through the centre of each cap piece, jack tube & spring, and through the end of the rocker and bolster, the whole may be made fast by turning on a nut at the lower end of each bolt. The opposite ends of the jacks should then be made fast to the sills or bottom of the carriage body with bolts and nuts as may be seen J.J. in the drawing: tubes and springs of the above dimensions being suitable for one horse pleasure carriages. The size proportion and num-ber of the tubes and springs may be varied to suit the views of the contrac-tor and the purpose to which they are to be applied. The invention here

9315X claimed, and for which a Patent is desired to be secured is the combined application of the springs and tube to the above named purpose —

Witnesses

David Fisher

Joseph Fisher

Henry Mellish

Drawing